United States Patent [19]

Hergenrother et al.

[11] 4,258,171
[45] Mar. 24, 1981

[54] POLYPHOSPHAZENE POLYMERS CONTAINING SUBSTITUTED ALKYL/CYCLOALKYL SUBSTITUENTS

[75] Inventors: William L. Hergenrother, Akron; Adel F. Halasa, Bath, both of Ohio

[73] Assignee: The Firestone Tire & Rubber Company, Akron, Ohio

[21] Appl. No.: 71,899

[22] Filed: Sep. 4, 1979

[51] Int. Cl.$^3$ ............... C08G 73/00; C08G 79/02
[52] U.S. Cl. ................... 528/168; 528/374; 528/392; 528/399
[58] Field of Search ............ 528/392, 399, 168, 374

[56] References Cited

U.S. PATENT DOCUMENTS 3,169,933  2/1965  Liu et al. .................. 528/399

Primary Examiner—Wilbert J. Briggs, Sr.

[57] ABSTRACT

Polyphosphazene polymers are prepared which contain repeating units represented by the formulas:

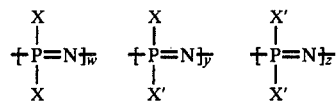

wherein X and X' are the same or different and are represented by:

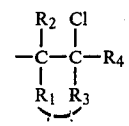

wherein $R_{1-4}$ are independently selected from the group consisting of hydrogen, halogen, nitro, cyano, alkylmercapto, arylmercapto, dialkylamine, alkyl, aryl, alkoxy, aryloxy and heterocyclic radicals or $R_1$ and $R_3$ when taken together can form a cycloalkyl or heterocyclic ring; X' can also be selected from a group consisting of chloro radicals, substituted or unsubstituted alkoxy, aryloxy, amino and mercapto radicals or mixtures thereof; and $20 \leq (w+y+z) \leq 50,000$ per polymer.

The polymers of the invention can be utilized to form protective films and can also be utilized in applications such as for molding, coatings, foams and the like.

16 Claims, No Drawings

POLYPHOSPHAZENE POLYMERS CONTAINING SUBSTITUTED ALKYL/CYCLOALKYL SUBSTITUENTS

BACKGROUND OF THE INVENTION

Polyphosphazene polymers containing repeating

units in which various unsubstituted and substituted alkoxy, aryloxy, amino and mercapto groups are attached to the phosphorus atom and their method of preparation are described in the prior art as illustrated in the publication "Phosphorus-Nitrogen Compounds," Academic Press, New York, New York, 1972 By H. R. Allcock and "Poly(Organophosphazenes)" Chemtech, Sept. 19, 1975, by H. R. Allcock and in such U.S. Pat. Nos. as 3,515,688; 3,702,833; 3,856,712; 3,974,242; and 4,042,561, which are hereby incorporated by reference.

However, none of the aforementioned publications or patents or for that matter, none of the prior art of which the applicants are aware, discloses or suggests polyphosphazene homopolymers or copolymers containing alkyl or cycloalkyl substituents attached directly to the phosphorous atom or to method of preparing such polymers.

SUMMARY OF THE INVENTION

This invention relates to polyphosphazene homopolymers and copolymers containing repeating

units in the polymer chain in which alkyl or cycloalkyl substituents are attached to the phosphorus atom. More particularly, the invention relates to polyphosphazene polymers having substituents attached to the phosphorus atom which are derived from alkylene group containing compounds and to a method of preparing such polymers. Optionally, any other substituent groups, such as chloro, alkoxy, aryloxy, amino and mercapto groups or mixtures thereof which are compatible with alkenyl substituents and are known in the polyphosphazene state of the art can be substituted onto the polyphosphazene in addition to the alkyl or cycloalkyl substituents. These optional substituents can be substituted onto the polyphosphazene by the method disclosed in the present invention or by prior art methods.

DETAILED DESCRIPTION OF THE INVENTION

The polymers of the invention contain repeating units represented by the formulas:

wherein X and X' are the same or different and represented by:

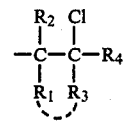

wherein $R_{1-4}$ are independently selected from the group consisting of hydrogen, halogen, nitro, cyano, alkylmercapto, arylmercapto, dialkylamino, alkyl, aryl, alkoxy, aryloxy and heterocyclic radicals or $R_1$ and $R_3$ taken together can form a cycloalkyl or a heterocyclic ring. It is preferred that either $R_2$ and $R_4$ or $R_3$ and $R_4$ are hydrogen. X' can also represent a chloro radical, substituted or unsubstituted alkoxy, aryloxy, amino or mercapto radical or a mixture of such radicals which are known in the state of the art in poly(phosphazene) technology and which are compatible with alkyl or cycloalkyl substituents. The polymer can contain from 20 to 50,000 of such units such that $20 \leq (w+y+z) \leq 50,000$. The various substituent groups, either X and X', can be substituted themselves with any "non-reactive" substituent group, i.e., a substituent group which is non-reactive with the various materials present during polymer formation. Suitable substituents include chloro, bromo, nitro, cyano, alkyl, aryl, aryloxy, alkoxy and the like.

One skilled in the art readily will recognize that steric hindrance will dictate the propriety of using relatively bulky groups adjacent to both sides of the alkylene bond since, as set forth hereinafter, the polymers are made by reacting an alkylene containing compound with a poly(dichlorophosphazene) and replacing a chlorine atom on a phosphorus atom of the polyphosphazene with an alkyl or cycloalkyl group formed from the saturation of the alkylene group. Desirably, groups which sterically inhibit this reaction should be avoided. With the foregoing proviso in mind, the selection of the substituents $R_{1-4}$ will be dependent on the reactivity of the alkenyl compound and will be apparent to one skilled in the art.

In the polymer units represented by the above formulas, all X substituent groups can be the same or they can be mixtures of different alkyl and/or cycloalkyl group and the X' substituent groups can be the same as the X substituent groups or can be alkoxy, aryloxy, amino or mercaptan groups or mixtures thereof.

When the term polymer is used herein it will include within its meaning both homopolymers and copolymers of substituted polyphosphazenes.

The phosphazene polymers of the invention can be represented by the formula:

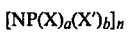

$$[NP(X)_a(X')_b]_n$$

wherein n is from 20 to 50,000 and $(a+b)=2$, and a and b are greater than zero.

The specific proportion of X to X' substituent groups incorporated in the copolymers of the invention can vary considerably depending upon chemical and physical properties desired in the copolymer and the particular end use application for which the copolymer is intended. Thus, for applications such as moldings, coatings, foams, and the like, the copolymer should contain at least 10 mole percent by weight and preferably 25 mole percent by weight of the alkyl or cycloalkyl substituent.

Where the presence of crosslinking functionality is desired, crosslinking functionality can be introduced in the polymer molecule through the use of ethylenically unsaturated substituent groups in addition to the groups X and X' set forth above. Examples of suitable crosslinking moieties and methods for their cure are set forth in U.S. Pat. Nos. 4,055,520; 4,061,606; 4,703,824; 4,083,825; and 4,076,658 which are hereby incorporated by reference and include —OCH=CH$_2$ and —OR$_3$CF=CF$_2$, as well as similar groups which contain unsaturation. Generally, when present the moieties containing crosslinking functionality are usefully present in an amount between about 0.1 mole percent and to about 50 mole percent and usually between about 0.5 mole percent to about 10 mole percent based on the replaceable chlorine in the starting poly(dichlorophosphazene). These crosslinking moieties are considered to fall within the scope of the term substituted alkoxy substituents as used in the claims.

The polymers can be used to prepare protective films and can be utilized in applications such as moldings, coatings, and the like.

THE METHOD OF PREPARATION

The polymers are prepared by reacting a poly(dichlorophosphazene) having the formula —(NPCL$_2$)$_n$—, in which n is from 20 to 50,000, in the presence of a tertiary amine with either one or more alkylene group containing compounds, or a mixture of one or more alkylene group containing compounds with one or more additional compounds which are reactive with the poly(dichlorophosphazene) in forming a copolymer having at least two different substitution groups on the backbone of the polyphosphazene. Examples of the additional compounds used to form copolymers are illustrated in the section entitled "Additional Reactive Compounds" below.

I. The Poly(dichlorophosphazene) Polymer

Poly(dichlorophosphazene) polymers which are employed as starting materials in the process of this invention are well known in the art as illustrated in U.S. Pat. Nos. 3,370,020; 4,005,171; and 4,055,520 and the aforementioned publications of H. R. Allcock, the disclosures of which are incorporated herein by reference.

These polymers have the general formula —(NPCl$_2$)$_n$—, in which n may range from 20 to 50,000 or more. As described in the aforementioned references, the polymers are in general prepared by the thermal polymerization of cyclic oligomers having the formula (NPCl$_2$)$_m$, in which m is an integer from 3 to 7, with the cyclic trimer and tetramer often comprising up to 90 percent of the oligomers and the ratio of trimer to tetramer varying with the method of manufacture.

The specific conditions of temperature, pressure and time employed in the thermal polymerization of the cyclic oligomers can vary considerably depending on whether or not the polymerization is catalyzed. Thus, temperatures can range from about 130° to about 300° C., pressures can range from a vacuum of less than about 10$^{-1}$ Torr to superatmospheric and polymerization reaction times can range from 30 minutes to about 48 hours.

A preferred process for preparing the poly(dichlorophosphazene) polymers used in the process of this invention is described in the aforementioned incorporated U.S. Pat. No. 4,005,171.

II. The Alkylene Group Containing Compounds Useful in Forming the Polymers of the Invention The alkylene group containing compounds which can be employed in producing the polymers of the invention are represented by the following structural formula:

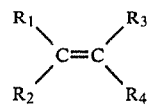

wherein R$_{1-4}$ are independently selected from the group consisting of hydrogen, halogen, nitro, cyano, alkylmercapto, arylmercapto, dialkylamino, alkyl, aryl, alkoxy, aryloxy and heterocyclic radicals or R$_1$ and R$_3$ taken together can form a cycloalkyl or a heterocyclic ring. R$_{1-4}$ can themselves be substituted with nonreactive substituents such as halo, nitro, cyano, alkyl, aryl, alkoxy, aryloxy groups and the like. It is preferred that R$_2$ and R$_4$ are hydrogen or that when R$_1$ and R$_2$ are not hydrogen R$_3$ and R$_4$ are hydrogen.

Illustrative examples of alkylene containing compounds which can be suitably employed in the present invention and R$_1$ and R$_3$ are not linked include: ethylene; propylene; 1-butene; 2-butene; 1-pentene; 2-pentene; 3-pentene; 1-, 2-, or 3-hexene; 1-, 2-, 3-, or 4-heptene; 1-, 2-, 3-, or 4-octene; 1-, 2-, 3-, 4-, or 5-nonene; 1-, 2-, 3-, 4-, or 5-decene as well as alkylene compounds containing up to 40 carbon atoms. These compounds can be further substituted with any of the non-reactive substitution groups listed above to form compounds such as styrene, alpha-methylstyrene, p-nitrostyrene, p-methoxystyrene, 1-propenyl-benzene, 2-propenylbenzene, 4-phenyl-1-butene, 4-phenyl-2-hexene, 3-phenoxy-1-propene, 4-p-nitrophenyl-1-butene, 4-p-cyanophenyl-1-butene, 4-napthyl-1-butene, 4-methyl-1-pentene, 4,5-dimethyl-1-hexene, 4,5-dimethoxy-2-hexene, 4,5-diethyl-2-hexene, 2-methyl-1-hexene, 4-methylmercapto-1-pentene, 4-phenylmercapto-2-butene, 3-dimethylamino-1-propene, 1,2-dichloroethylene, 1,2-dibromoethylene, allyl phenyl ether and the like. The term alkyl group containing and substituted alkyl groups containing when used in the specification includes all of the substituents of the present invention which are derived from the above-identified substituted and unsubstituted alkenes.

Illustrative examples of alkylene containing compounds which can suitably be employed in the present invention when R$_1$ and R$_2$ together form a cyclic compound include: cyclopropylene, cyclobutene, cyclopentene, cyclohexene, cycloheptene, indene and the like. These compounds can themselves be substituted with the above nonreactive substituents. The term cycloalkyl when used in this specification includes all of the substituents of the present invention which are derived from the above-identified cycloalkenes and their substituted derivatives.

The preferred alkenyl group containing compounds for use in the present invention are indene, propylene, styrene, alphamethyl-styrene and allyl phenyl ether.

III. Additional Reactive Compounds

As indicated heretofore, the polyphosphazene copolymers of the invention in addition to the substituted alkyl or cycloalkyl substituent group can contain chloro groups and substituted or unsubstituted alkoxy, aryloxy, amino or mercapto groups or mixtures thereof.

Preferred substituent groups represented by X' for use in these copolymers are:

Alkoxy groups (substituted or unsubstituted) derived from aliphatic alcohols having from 1 to 20 carbon atoms such as methanol, ethanol, propanol, isopropanol, n-butanol, sec-butanol, hexanol, dodecanol, and the like; fluoroalcohols, especially those represented by the formula $Z(CF_2)_nCH_2OH$ in which Z is hydrogen or fluorine and n is an integer from 1 to 10 as illustrated by trifluoroethanol; 2,2,3,3,3-pentafluoropropanol; 2,2,3,3,4,4,4-heptafluorobutanol; 2,2,3,3-tetrafluoropropano; 2,2,3,3,4,4,5,5-octafluoropentanol; 2,2,3,3,4,4,5,5,6,6,7,7-dodecafluoroheptanol and the like. In instances where it is desired to incorporate mixed X' substituent groups in the copolymer, mixtures of the foregoing alcohols can be employed.

Aryloxy groups (substituted or unsubstituted) derived from aromatic alcohols including among other phenol; alkyl-phenols such as cresols, xylenols, p-, o-, and m-ethyl and propyl phenols and the like; halogen-substituted phenols such as p-, o-, and m-chloro and bromophenols and di- or tri-halogen substituted phenols and the like; and alkoxy-substituted phenols such as 4-methoxyphenol, 4-(n-butoxy)-phenol and the like. Mixtures of the foregoing aromatic alcohols can also be employed.

Amino groups derived from any of the amino compounds heretofore employed in the polyphosphazene polymer art. Thus, amino groups may be derived from aliphatic primary and secondary amines such as methylamine, ethylamine, dimethylamine, ethylmethylamine and the like and aromatic amines such as those described in U.S. Pat. No. 4,042,561 (hereby incorporated by reference) as illustrated by aniline, halogen-substituted anilines, alkyl-substituted anilines, alkoxy-substituted anilines and the like.

Mercapto groups derived from any of the mercaptan compounds heretofore employed in the polyphosphazene polymer art. Thus, for example, the mercaptan compounds described in U.S. Patent 3,974,242 to Lanier et al (hereby incorporated by reference) may be utilized. Representative of suitable mercaptan compounds as described in the aforementioned patent are methyl mercaptan and its homologs, ethyl, propyl, butyl, aryl and hexyl mercaptan, thiophenol, thionaphthols, benzyl mercaptan, cyclohexyl mercaptan and the like.

IV. The Tertiary Amine

The use of tertiary amines in preparing the polymers of the invention minimizes undesirable side reactions and at the same time acts as an effective acid scavenger.

Tertiary amines which can be employed in preparing the polymers of the invention are those represented by the general structure:

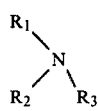

wherein $R_1$, $R_2$ and $R_3$ can each be alkyl containing from 1 to 8 carbon atoms. Thus, for example, the tertiary amine can be a trialkyl amine such as trimethylamine, triethylamine, triisopropylamine, tri-n-propylamine, tri-isobutylamine, tri-n-butylamine, and the like. In addition, tertiary amines such as pyridine and those containing diamine groups such as N,N,N',N'-tetramethylethylene diamine (TMEDA) can also be utilized.

The preferred tertiary amines for use in preparing the polymers of the invention are triethylamine; N,N,N',N'-tetramethylethylene diamine; pyridine; N-methyl morpholine; N-methyl pyrrole; 1,4-diazabicyclo(2.2.2)octane (DABCO) and dipiperidyl ethane.

As indicated above, the polymers of the present invention are prepared by reacting the poly(dichlorophosphazene) polymer and the alkenyl group containing compound in the presence of a tertiary amine. Optionally, compounds listed in the group of "Additional Reactive Compounds" and which can be substituted onto the poly(dichlorophosphazene) in the presence of a tertiary amine can be employed in the reaction mix.

The specific reaction conditions and proportion of ingredients employed in preparing these polymers can vary somewhat depending on factors such as the reactivity of the specific alkenyl group containing compound utilized, the particular tertiary amine employed, and degree of substitution desired in the finished polymer. In general, reaction temperature can range from about 25° C. to about 200° C. and times can range from 3 hours up to 7 days; lower temperatures necessitating longer reaction times and higher temperatures allowing shorter reaction times. These conditions are, of course, utilized in order to obtain the most complete reaction possible, i.e., in order to insure the substantial conversion of the chlorine atoms in the polymer to the corresponding substituted alkyl or cycloalkyl substituents and form a substantially hydrolytically stable polymer. The reaction which occurs is the replacement of the chlorine atom on the poly(dichlorophosphazene) backbone with an alkyl group which is formed from the saturation of the alkylene group as one carbon in the alkylene group replaces the chlorine atom on the polyphosphazene which in turn attaches to the remaining carbon of the saturated alkenyl radical.

The above reaction is ordinarily carried out in the presence of a solvent or a mixture of solvents. The solvent employed in the reaction should be a solvent for the poly(dichlorophosphazene) polymer, the alkylene group containing compound and the tertiary amine. Aliphatc and aromatic hydrocarbons and chlorinated hydrocarbons are the preferred solvents. Examples of suitable solvents which may be employed include cyclohexane, chloroform, methylene chloride, toluene, and xylene. The amount of solvent is not critical and any amount sufficient to solubilize the reaction mixture materials can be employed. Additionally, the materials in the reaction zone should be reasonably free of water. The prevention of substantial amounts of water in the reaction system is necessary in order to inhibit the undesirable side reaction of the available chlorine atoms in the chloropolymer. Preferably, the reaction mixture should contain less than about 0.01 percent water.

In general, the amount of alkylene group containing compound and if present, the other compounds which are substitutionally reactive with poly(dichlorophosphazene) employed in the process should be at least molecularly equivalent to the number of available chlorine atoms in the starting polymer. However, if desired, an excess of such compounds can be employed in order to insure substantially complete reaction of all the available chlorine atoms.

While the alkyl and cycloalkyl substituted poly(phosphazene) polymers and copolymers of the present invention have been prepared in the above-identified manner, that is, in the presence of a tertiary amine, alternative methods of preparation are available for preparation of the copolymer.

The prior art methods of poly(dichlorophosphazene) substitution such as by reaction with sodium alkoxide as demonstrated in U.S. Pat. No. 3,370,020 to Allcock et al, cannot be used to prepare the phosphazene polymers of the present invention as the salt of the alkenyl group containing compound can not be formed.

The prior art methods may be used to partially substitute the poly(dichlorophosphazene) with the substituents derived from the compounds listed in the list of additional reactive compounds. The remaining chlorines on the partially substituted poly(dichlorophosphazene) are then replaced with alkyl or cycloalkyl groups using the tertiary amine substitution process thereby forming a copolymer. Alternatively, the alkyl or cycloalkyl group can be used to partially substitute the poly(dichlorophosphazene) before the prior art methods are used to substitute the copolymer substituents.

The following examples are submitted for the purpose of further illustrating the nature of the present invention and are not intended as a limitation on the scope thereof. Parts and percentages referred to in the example and throughout the specification are by weight unless otherwise indicated. All temperatures are degrees Centigrade unless otherwise specified.

EXAMPLE 1

A 10-ounce bottle was charged with 50 cc of toluene, 10.25 cc (88 millimoles) of indene, 12.33 cc (88 millimoles) of triethylamine, and 137.5 g (40.0 millimoles) of a 3.37% toluene solution of poly(dichlorophosphazene).

The bottle and its contents were heated for 20 hours at 120° C. whereupon a slight amount of triethylamine hydrochloride was formed and the clear solution in the bottle became slightly yellow-red in color. The yellow-red solution was subjected to Infrared spectroscopy and no P-Cl bands at 600 cm$^{-1}$ were detected.

The solution was coagulated in methanol to yield 7.22 gms of a brown plastic polymer having a $T_g$ of 28° C. and the following elemental analysis:

|  | C | H | N | P | Cl |
|---|---|---|---|---|---|
| Actual (%) | 48.84 | 5.69 | 6.09 | 12.69 | 17.42 |
| Calculated[1] (%) | 48.98 | 5.04 | 6.87 | 12.38 | 17.13 |

[1]Calculated for a composition of 12.5% triethylamine hydrochloride, 16.1% hydrolyzed chloropolymer, 68.4% of poly-(di-3-chloro-2,3-dihydroindenylphosphazene) derivative.

EXAMPLE 2

A 10-ounce bottle was charged with 100 cc of dry alcohol-free chloroform, 5.7 cc (44 millimoles) of indene, 3.2 cc (44 millimoles) of trifluoroethanol, 12.3 cc (88 millimoles) of triethylamine and 36.5 gms (40.3 millimoles) of a 12.87% solution of poly(dichlorophosphazene) in Chloroform.

The bottle and its contents were heated for 68 hours at 120° C. and then cooled to yield a black solution which was subjected in Infrared spectroscopy which detected no P-Cl bands at 600 cm$^{-1}$. The black solution was coagulated in methanol to yield 10.34 gms of a black rubbery copolymer.

EXAMPLE 3

The same procedure and starting materials were used as in Example 2 except the trifluoroethanol was replaced with 4.43 cc (44 millimoles) of p-chlorophenol. The resultant copolymer produced a yield of 7.07 gms of a brown rubbery polymer.

EXAMPLE 4

A 10-ounce bottle was charged with 11.53 gms (44 millimoles) of perfluorocyclohexene, 4.43 cc (44 millimoles) of p-chlorophenol, 100 cc of dry alcohol-free chloroform, 12.3 cc (88 millimoles) of triethylamine, and 56.88 gms (40.2 millimoles) of a 8.2% solution of poly(dichlorophosphazene) in cyclohexane. The same procedure was followed as in Example 2. The resultant solution showed a total loss of the P-Cl band at 600 cm$^{-1}$ under Infrared spectroscopy while new bands were formed at 573 cm$^{-1}$, 542 cm$^{-1}$, 528 cm$^{-1}$, 508 cm$^{-1}$, and 485 cm$^{-1}$. The solution was coagulated in methanol to yield 7.86 gms of a dark red rubbery copolymer.

EXAMPLE 5

The same procedure and starting materials were used as in Example 4 except that the perfluorocyclohexene was replaced with 6.04 cc (44 millimoles) of allyl phenyl ether. A yield of 8.14 gms of a red rubbery copolymer was obtained by alcohol coagulation from a solution which under IR showed a complete loss of the P-Cl band at 600 cm$^{-1}$ and the formation of new bands at 568 cm$^{-1}$, 543 cm$^{-1}$, 513 cm$^{-1}$ and 478 cm$^{-1}$.

What is claimed is:

1. A polyphosphazene polymer containing units represented by the formulas:

$$\left(\begin{array}{c} X \\ | \\ P=N \\ | \\ X \end{array}\right)_W \quad \left(\begin{array}{c} X \\ | \\ P=N \\ | \\ X' \end{array}\right)_Y \quad \left(\begin{array}{c} X' \\ | \\ P=N \\ | \\ X' \end{array}\right)_Z$$

wherein X is:

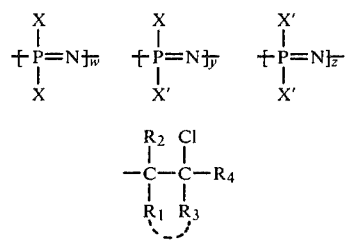

in which $R_{1-4}$ are independently selected for each unit from the group consisting of hydrogen, halogen, nitro, cyano, alkylmercapto, arylmercapto, dialkylamino, alkyl, aryl, alkoxy, aryloxy, and heterocyclic radicals or $R_1$ and $R_3$ taken together form a cycloalkyl or heterocyclic ring; wherein X' is the same as X or is selected from the group consisting of chloro radicals and substituted and unsubstituted alkoxy, aryloxy, amino, mercapto radicals and mixtures thereof, and $20 \leq (W+Y+Z) \leq 50,000$.

2. The polymer or claim 1 in which one of the group $R_2$ and $R_4$ or $R_3$ and $R_4$ are hydrogen.

3. The polymer of claim 1 in which X is derived from indene.

4. The polymer of claim 3 in which X' is derived from trifluoroethanol.

5. The polymer of claim 3 in which X' is derived from parachlorophenol.

6. The polymer of claim 1 in which X is derived from a group consisting of styrene, alpha-methylstyrene, propylene, perfluorocyclohexene and allyl phenyl ether.

7. The polymer of claim 6 in which X' is derived from trifluoroethanol.

8. The polymer of claim 6 in which X' is derived from para-chlorophenol.

9. The polymer of claim 6 in which X' is the same as X.

10. The polymer of claim 1 in which X' is derived from a compound selected from a group consisting of trifluoroethanol, parachlorophenol, and mixtures thereof.

11. The polymer of claim 1 in which the polymer units are randomly distributed.

12. A method of preparing polyphosphazene polymer containing units represented by the formula:

wherein X is:

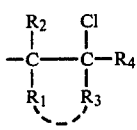

in which $R_{1-4}$ are independently selected for each unit from the group consisting of hydrogen, halogen, nitro, cyano, alkylmercapto, arylmercapto, dialkylamino, alkyl, aryl, alkoxy, aryloxy, and heterocyclic radicals or $R_1$ and $R_3$ taken together form a cycloalkyl or heterocyclic ring; wherein X' is the same as X or is selected from the group consisting of chloro radicals and substituted and unsubstituted alkoxy, aryloxy, amino, mercapto radicals and mixtures thereof; said method comprising reacting a poly(dichlorophosphazene) polymer having a formula $-(NPCl_2)_n-$, wherein n is from 20 to 50,000, with an alkenyl group containing compound and optionally a compound selected from a group consisting of substituted and unsubstituted alkanols, aromatic alcohols, amines, mercaptans, and mixtures thereof in the presence of a tertiary amine.

13. The method of claim 12 in which X is derived from a compound selected from the group consisting of indene, styrene, alpha-methylstyrene, propylene, perfluorocyclohexene and allyl phenyl ether.

14. The method of claim 13 in which the alkanol is selected from the group consisting of trifluoroethanol, para-chlorophenol, and mixtures thereof.

15. The method of claim 13 in which X' is the same as X.

16. The method of claim 12 in which the tertiary amine is triethylamine.

* * * * *